United States Patent
Farine et al.

(10) Patent No.: US 7,023,905 B2
(45) Date of Patent: Apr. 4, 2006

(54) CORRELATION AND DEMODULATION CIRCUIT FOR A RECEIVER FOR SIGNALS MODULATED BY A SPECIFIC CODE

(75) Inventors: Pierre-André Farine, Neuchâtel (CH); Jean-Daniel Etienne, Les Geneveys-sur-Coffrane (CH); Ruud Riem-Vis, Neuchâtel (CH); Elham Firouzi, Ligerz (CH)

(73) Assignee: Asulab S.A., Marin (CH)

( * ) Notice: Subject to any disclaimer, the term of this patent is extended or adjusted under 35 U.S.C. 154(b) by 739 days.

(21) Appl. No.: 09/994,886

(22) Filed: Nov. 28, 2001

(65) Prior Publication Data

US 2002/0075945 A1    Jun. 20, 2002

(30) Foreign Application Priority Data

Dec. 18, 2000    (CH)    ..................................... 2468/00

(51) Int. Cl.
*H04B 15/00*    (2006.01)
*H04K 1/00*    (2006.01)
*H04L 27/00*    (2006.01)

(52) U.S. Cl. ........................ 375/150; 375/142; 375/224

(58) Field of Classification Search ................ 375/130, 375/142, 150, 343, 224; 342/357.12; 714/712, 714/715
See application file for complete search history.

(56) References Cited

U.S. PATENT DOCUMENTS

| | | | |
|---|---|---|---|
| 4,100,531 A | | 7/1978 | Kobayashi |
| 4,910,525 A | * | 3/1990 | Stulken ...................... 342/418 |
| 5,093,800 A | | 3/1992 | Ifune |
| 5,117,232 A | * | 5/1992 | Cantwell ............... 342/357.12 |
| 6,493,378 B1 | * | 12/2002 | Zhodzishsky et al. ...... 375/149 |
| 2003/0040852 A1 | * | 2/2003 | Green et al. .................. 701/13 |

* cited by examiner

*Primary Examiner*—Jean B. Corrielus
(74) *Attorney, Agent, or Firm*—Sughrue Mion, PLLC (57) ABSTRACT

The correlation and demodulation circuit (6) in particular for a pseudo-random code radio-frequency signal receiver (1) includes a correlation stage (7) connected to a microprocessor (12) in particular for configuring the correlation stage in normal operating mode or in test mode. In normal operation the stage receives intermediate signals (IF) corresponding to the radio-frequency signals shaped in means (3) for receiving the modulated signals from the receiver. The intermediate signals are correlated in a correlator control loop (8) of said correlation stage (7) with a replica of the first code supplied by a code generator (25). The code generator (25) is adapted via a microprocessor (12) to generate a replica of a pseudo-random code of shorter repetition length than the pseudo-random code of the radio-frequency signals. Intermediate test signals ($IF_{test}$) with a reduced pseudo-random code are supplied to the correlation stage (7) so as to perform a test representative of the correlation stage in closed loop operation more quickly than with conventional intermediate signals.

13 Claims, 5 Drawing Sheets

CORRELATION AND DEMODULATION CIRCUIT FOR A RECEIVER FOR SIGNALS MODULATED BY A SPECIFIC CODE

This application claims priority from Swiss Patent Application No. 2468/00 filed Dec. 18, 2000, the entire disclosure of which is incorporated herein by reference.

FIELD OF THE INVENTION

The invention concerns a correlation and demodulation circuit for a receiver for signals modulated by a first code of a determined repetition length, said first code defining a source transmitting said signals. This circuit includes a correlation stage connected to control means in particular for configuring said correlation stage in normal operating mode or test mode. In normal operating mode, said stage is intended to receive intermediate signals corresponding to the modulated signals shaped in the receiver modulated signal receiving means. The intermediate signals are then correlated in a correlator control loop of said correlation stage with a first code replica generated by a code generator.

BACKGROUND OF THE INVENTION

The signals which are modulated in particular to the carrier frequency, and which are transmitted by one or several transmitter sources, usually include messages which have to be demodulated in the correlation and demodulation circuit. The code which modulates said signals to define the transmitter source is usually a pseudo-random code. This determined repetition length code is unique for each transmitter source so as to be able to recognise which transmitter source the signals received by the receiver are coming from. They may be for example signals in the telecommunication field or positioning signals using satellites, such as GPS type signals.

In the case of GPS receivers, the radio-frequency signals are transmitted by several satellites placed in orbit which are distinguished from each other by a specific pseudo-random code, called the Gold code, modulated on the carrier frequency signals. The Gold code is a digital signal which is formed of 1023 chips and which is repetitioned every millisecond. The chips have values of 1 or 0 like a bit. All the Gold codes have the characteristic of being orthogonal which consequently means that by correlating them with each other the correlation result gives a value close to 0. This characteristic allows several radio-frequency signals simultaneously coming from several satellites to be processed independently for example in several correlation channels of the same receiver.

The GPS signals supply position and time data to a receiver for calculating operations of the X, Y and Z position, speed and universal time. However, in order to determine position and time, the receiver has to obtain data from at least four visible satellites.

In various fields of use of specific code modulated signal receivers, such as radio-frequency signals, one has to assure that the parts of the receiver which allow in particular the messages to be extracted from the received signals, work properly. Operating tests may be performed on said receiver parts either before or after the assembly thereof. Of course, said receiver parts have had to undergo several preliminary steps of elementary tests before their operation can be checked generally.

During use of a GPS receiver, an operating test of said receiver has to be performed in close to real conditions in order to assure that each channel of a correlation stage is working properly. If this operating test is successful, this allows the validity of the position, speed and time calculations for example to be guaranteed to the user of the receiver.

By way of example, in particular in the field of telecommunications, U.S. Pat. No. 4,100,531 discloses means for measuring the bit error rate of digital equipment, such as a data transmission device. This equipment is tested using pseudo-random code (PRN code) test signals supplied by a transmitter and received by a receiver to be tested. The receiver tested generates a PRN code replica to be correlated in a correlation stage with the signals modulated by the PRN code of determined length.

One drawback of this equipment is that the encoded test signals are sent by an external transmitter to the receiver in order to be tested, which does not allow the test time to be significantly reduced. Moreover, another drawback is that the transmitted signals have to be the image of the real communication signals to constitute a test representative of the receiver's operation. This inevitably involves having additional noise on the test signals, which is often difficult to produce.

In the field of GPS type receivers, U.S. Pat. No. 5,093,800 discloses a test apparatus capable of generating GPS type radio-frequency signals. These GPS signals generated by the apparatus are intended to be received by a GPS receiver to be tested. In order to do this, the apparatus also includes data relating to the satellites so as to be able to generate and transmit signals corresponding to the encoded signals transmitted by several satellites to the receiver.

One drawback noted with this test apparatus lies in the fact that in order to be able to check that the correlation stage of the receiver is working properly, the test signals are radio-frequency signals equivalent to the radio-frequency signals transmitted by satellites. This obviously involves generating additional noise with the radio-frequency signals generated in the apparatus in order to check that the correlation stage is working properly. Moreover, another drawback is that the receiver operating test time is relatively long since it is dependent on the repetition length of the pseudo-random code, i.e. the Gold code. If the receiver is mounted in a device powered by a battery or an accumulator, the long test time may also run down said battery or said accumulator unnecessarily.

SUMMARY OF THE INVENTION

One object of the invention consists in providing a correlation and demodulation circuit for a receiver for signals modulated by a code capable of reducing as far as possible the test time representing the operation of said circuit overcoming the drawbacks of the test devices or methods of the prior art. Moreover, by effecting an operating test of said circuit, parameters linked to the received signal noise may be taken into account.

This object, in addition to others are achieved by the correlation and demodulation circuit described hereinbefore which is characterised in that in test phase, said code generator is adapted via control means to generate a replica of a second repetition code shorter than the first code for correlation operations with test intermediate signals modulated by the second repetition code shorter than the first code and supplied to the correlation stage so as to perform a test representative of the closed loop operation of the correlation stage more quickly than with signals modulated by the first code.

One advantage of the correlation and demodulation circuit is that the closed loop test time of the correlation stage is greatly reduced. This allows the operating state of said circuit, and thus of the receiver containing it, to be known quickly.

In the case of a GPS type radio-frequency signal receiver, the correlation and demodulation circuit test time may be relatively long if the pseudo-random code repetition length is equivalent to the Gold code. Moreover, this test time is also long if said circuit includes several correlation channels in the correlation stage. This is why the intermediate test signals are supplied to the correlation stage of the circuit with a pseudo-random code of reduced length for a quick check of the circuit's operation.

Since the radio-frequency signals also include noise, the reduced pseudo-random code length may be defined so as to take account of this noise. The reduced code test signals, which are generated without any noise, allow correlation stage integrator counter output signals to be provided whose power is close to the power of the real output signals which include noise. Preferably, the pseudo-random code repetition length of the test signals is 31 chips, while that of the Gold code is 1023 chips.

These intermediate test signals may be generated outside the correlation and demodulation circuit or preferably inside the circuit by integrated test signal generating means. These test signal generating means only take a small amount of space in the correlation and demodulation circuit, since they are formed of only forty or so logic gates or flip-flops, while the circuit has close to 2 million transistors. These test signal generating means are switched on by the control means, i.e. by the microprocessor means.

Advantageously, said test signal generating means may be switched on at periods of time programmed in the microprocessor means. When said circuit is mounted in the complete receiver, switching-on of said test signal generating means prevents intermediate signals being sent by the receiving means of the receiver to said circuit. Thus, in test phase, the circuit only receives the intermediate test signals originating from the test signal generating means.

These test signals are imposed identically in all the channels of the correlation stage for a simultaneous test of the channels. The microprocessor controls each channel's code generator, so that it generates a replica of the reduced pseudo-random code for each channel in test phase.

It is to be noted that no test signals are provided from outside the complete receiver. Conversely, noise-free operating check test signals are preferably applied instead of the conventional intermediate signals to the correlation and demodulation circuit.

The reduction in the correlation and demodulation circuit test time is in theory necessary when the circuit is mounted in a modulated signal receiver in order to perform a test phase quickly. This reduction in the test time may prevent too much energy being consumed in an accumulator or storage-battery if the receiver is mounted in a portable object, such as a watch or a telephone. However, the correlation and demodulation circuit can also be tested prior to being mounted in the receiver with noise-free test signals supplied to the correlation stage corresponding to conventional intermediate signals.

A user can also, on his own initiative, perform a complete test of the receiver correlation and demodulation circuit at any time.

BRIEF DESCRIPTION OF THE DRAWINGS

The objects, advantages and features of the correlation and demodulation circuit will appear more clearly in the following description of embodiments of said circuit illustrated by the drawings, in which.

DETAILED DESCRIPTION OF THE INVENTION

In the following description, the embodiments of the correlation and demodulation circuit will be explained with reference to a GPS type radio-frequency signal receiver. It is to be noted that several elements of the receiver which are known to those skilled in the art in this technical field will not be explained in detail in said description.

In this type of GPS receiver, the received radio-frequency signals, which are modulated by a pseudo-random code, called the Gold code, further include messages to be demodulated by the correlation and demodulation circuit. The messages from at least four satellites thus allow microprocessor means of the circuit to calculate in particular the X, Y and Z position, the speed of the receiver and/or the time. However, the use of such a correlation and demodulation circuit may also be envisaged in other types of receivers for signals modulated by a code of determined repetition length. For example, the correlation and demodulation circuit may be used in a telecommunication receiver, or in a measuring receiver which use light signals carrying a determined code, or in other fields.

Figure 1:
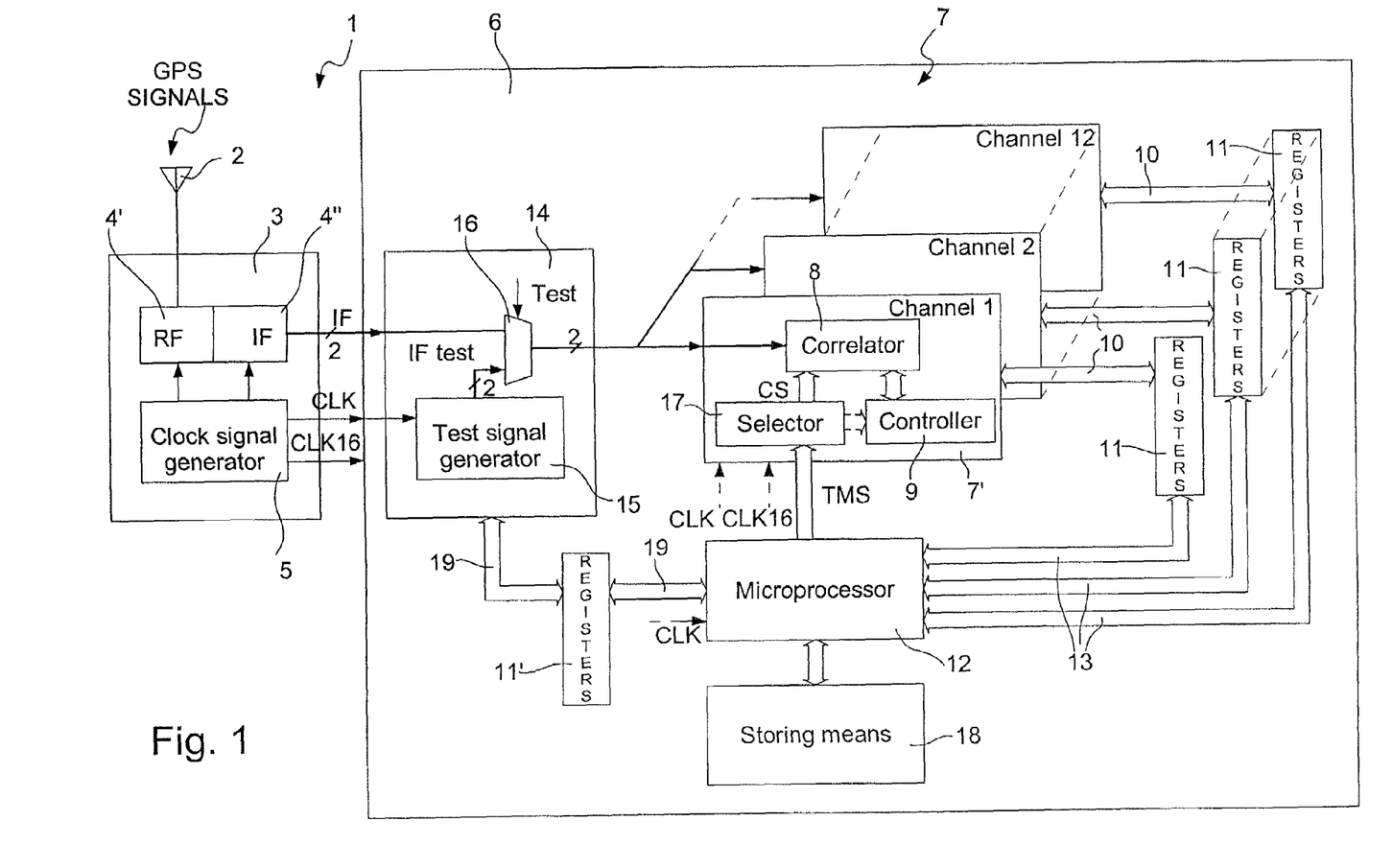
FIG. 1 shows schematically a radio-frequency signal receiver with a correlation and demodulation circuit according to the invention.

The GPS type receiver with the correlation and demodulation circuit is shown schematically in FIG. 1. It is formed of an antenna 2 for receiving GPS radio-frequency signals originating from several satellites, means 3 for receiving and shaping the radio-frequency signals supplied by antenna 2, and a correlation and demodulation circuit 6 receiving intermediate signals IF in complex form at a frequency of the order of 400 kHz from receiving means 3.

In receiving means 3, a first electronic circuit 4' first converts the radio-frequency signals from a frequency 1,57542 GHz into a frequency for example of 179 MHz. A second electronic circuit IF 4" carries out a double conversion to adjust the GPS signals first to a frequency of 4.76 MHz then finally to a frequency of 400 kHz by sampling at 4.36 MHz. Intermediate complex signals IF sampled and quantified at a frequency of the order of 400 kHz are thus supplied to the correlation and demodulation circuit. The intermediate complex signals IF are thus formed of an in-phase signal I and a quarter-phase signal Q represented in the Figure by a bold line intersected by an oblique line defining 2 bits. However, these intermediate signals IF could be defined over 4 bits if a 2-bit conversion had been performed in a preceding stage, or 2n bits (n being an integer greater than 1).

For the frequency conversion operations, a clock signal generator 5 forms part of radio-frequency receiving and shaping means 3. This generator is provided for example with a quartz oscillator which is not shown, calibrated to a frequency of the order of 17.6 MHz. Two clock signals CLK and CLK16 are supplied to the correlation and demodulation circuit to clock all of the circuit's operations. The first clock frequency CLK may have a value of 4.36 MHz, while the second clock frequency may be fixed at 16 times less, i.e. 272.5 kHz used for a large part of the correlation stage in order to save on energy consumption.

It is to be noted that the signals supplied by first circuit 4' give, for example in half of the cases, signals of different parity (+1 and −1) with 2 output bits (+3; +1; −1; −3) with 4 output bits. Account must therefore be taken of this parity for the GPS signal demodulating operations in the receiver.

Said correlation and demodulation circuit 6 includes a correlation stage 7 formed of 12 channels 7', a data transfer bus 10 connecting each channel to a respective buffer register 11, and a data bus 13 connecting each buffer register to microprocessor means 12. Storage means 18 connected to the microprocessor form part of microprocessor means 12 in order to store for example data relating to each satellite placed in orbit and carrier frequency and pseudo-random code parameters for each satellite. All of the elements forming the correlation and demodulation circuit can be made on a single semiconductor substrate, such as a silicon substrate.

At the input of correlation and demodulation circuit 6 are placed test signal generating means 14 which include a test signal generator 15 and a multiplexer 16. Multiplexer 16 of test signal generating means 14 receives, at an input, intermediate signals IF supplied by receiving means 3 and at another input intermediate test signals $IF_{test}$. Said multiplexer 16 is controlled by a control signal Test supplied by control means integrated in microprocessor means 12 through control buses 19 and a buffer register 11'. Multiplexer 16 could also be integrated in test signal generator 15 if required.

In normal operating mode without control signal Test, intermediate signals IF representative of the radio-frequency signals transmitted by several satellites are transmitted by multiplexer 16 to correlation stage 7 for all the channels 7'. Certain channels are configured differently in normal operating mode via microprocessor 12 so that they each search a visible satellite using intermediate signals IF in order to demodulate the received GPS messages. Conversely, when microprocessor 12 orders a test phase, microprocessor 12 sends test control signals in particular to test signal generating means 14 via control buses 19. In this test phase, test signal generator 15 is thus switched on, and multiplexer 16 receiving test signal Test transmits only intermediate test signals $IF_{test}$ generated by generator 15 to correlation stage 7. Said test signal generator will be explained in more detail with reference to FIG. 2.

Once switched on, test signal generator 15 generates intermediate test signals $IF_{test}$ instead of the conventional intermediate signals to perform a test representative of the correlation stage in a closed loop. These test signals $IF_{test}$ are modulated with a pseudo-random code of shorter repetition length than the Gold code in order to perform a closed loop test more quickly. Preferably, the reduced pseudo-random code repetition length is 31 chips, i.e. $2^5-1$, whereas the Gold code has a repetition length of 1023 chips, i.e. $2^{10}-1$.

In the 1023 chips, close to 1000 chips, in proportion, may be considered as equivalent to the radio-frequency signal noise. Consequently, a reduced code of 31 chips has been chosen in order to be able to provide noise-free intermediate test signals for a test which is representative of the correlation stage.

Of course, for other fields of use of the correlation and demodulation circuit, the repetition length of the reduced second pseudo-random code may be $2^{(n-m)}-1$, whereas the repetition length of the first pseudo-random code of the received signals is $2^n-1$. The numbers n and m are integer numbers with n greater than 3 and m taking a determined value between 1 and n−1.

In test phase, microprocessor 12 sends test control signals TMS to test selectors 17 each placed in a respective channel 7'. Each channel 7' includes a correlator 8 receiving signals IF or $IF_{test}$ and preferably a controller 9 intended to set into operation via a dedicated material, in particular a signal processing algorithm for acquiring a satellite signal and tracking said satellite detected by the channel. Test selectors 17 each connected to a respective correlator 8 have the task of supplying instructions CS to said correlator in particular for configuring a pseudo-random code generator, which will be explained in more detail with reference to FIG. 3b.

In normal operation, no instructions CS are transmitted by selector 17 to correlator 8, which means that the code generator is intended to generate a code replica having an equivalent repetition length to the Gold code. In test phase however, upon the command of microprocessor 12, selector 17 sends instructions CS for configuring the code generator so that it generates a pseudo-random code replica having a shorter repetition length than the Gold code. This reduced pseudo-random code must thus be a pseudo-random code modulated on the intermediate test signals in test phase.

Control signals TMS are in theory defined as a two-bit control word for normal operation or various test modes. If TMS equals 00 in binary digits, then no test instruction CS is transmitted for normal operation. If TMS equals 11 in binary digits, the closed loop test mode is imposed to check that all the channels 7' of correlation stage 7 are working properly with intermediate test signals $IF_{test}$ introduced at the input. If TMS equals 01 in binary digits, a test can be undertaken of correlator module 8 of each channel via a test vector generator which is not shown, controlled by microprocessor 12. If TMS equals 10 in binary digits, a test can be undertaken of controller module 9 of each channel via the test vector generator. In the present invention, the signals TMS preferably take the values 00 or 11.

In an alternative embodiment which is not shown, all the selectors 17 could form part of microprocessor means 12. Likewise, instructions CS for each correlator 8 could transit via buses 10 and 13.

At the same time that selector 17 sends instructions CS, microprocessor 12 transmits via buses 13 and 10 parameters relating to the pseudo-random code to be searched, and to the carrier frequency of the intermediate test signals. These parameters are transmitted for configuring all the channels 7' in test phase, as occurs also in normal operation, but individually for each channel. However, in test phase, the parameters are the same for all the channels so that the intermediate test signals $IF_{test}$ with a reduced unique pseudo-random code are processed in all the channels simultaneously and in an identical way.

As indicated hereinbefore in normal operation, registers 11 of each channel are capable of receiving configuration data or parameters originating from microprocessor 12 and storage means 18 which are associated therewith for each correlation channel 7'. Via registers 11, data concerning the GPS messages, the state of the PRN code, the frequency increment relating to the Doppler-effect, pseudo-ranges and other data can be transmitted to microprocessor 12 after correlation and locking onto a specific satellite.

In test phase, said registers 11 receive the results of the closed loop test, as well as the messages to be processed by the microprocessor. After the test, the microprocessor can thus check whether all the correlation channels are operating correctly independently of the exterior before setting the correlation and demodulation circuit in normal operation.

It is also to be noted that these registers 11 can accumulate data during the correlation phase which will be used during the satellite acquisition and tracking operations without necessarily being transferred automatically to microprocessor 12.

In an alternative embodiment, a single block of registers 11 may be envisaged for all the channels 7' of the correlation stage, given that certain data placed in the register block is common to each channel.

Given that each channel 7' includes a controller 9 for all the satellite acquisition and tracking phases, microprocessor 12 may be of reduced size. This microprocessor 12 may for example be an 8-bit CoolRISC-816 microprocessor by EM Microelectronic-Marin SA, Switzerland. However, a microprocessor of larger dimensions, for example a 32-bit microprocessor could be used to avoid placing a controller 9 in each channel. This microprocessor of larger size would have, in such case, to take care of all the satellite acquisition and tracking procedure tasks in normal operation and in test phase according to the invention.

Figure 2:
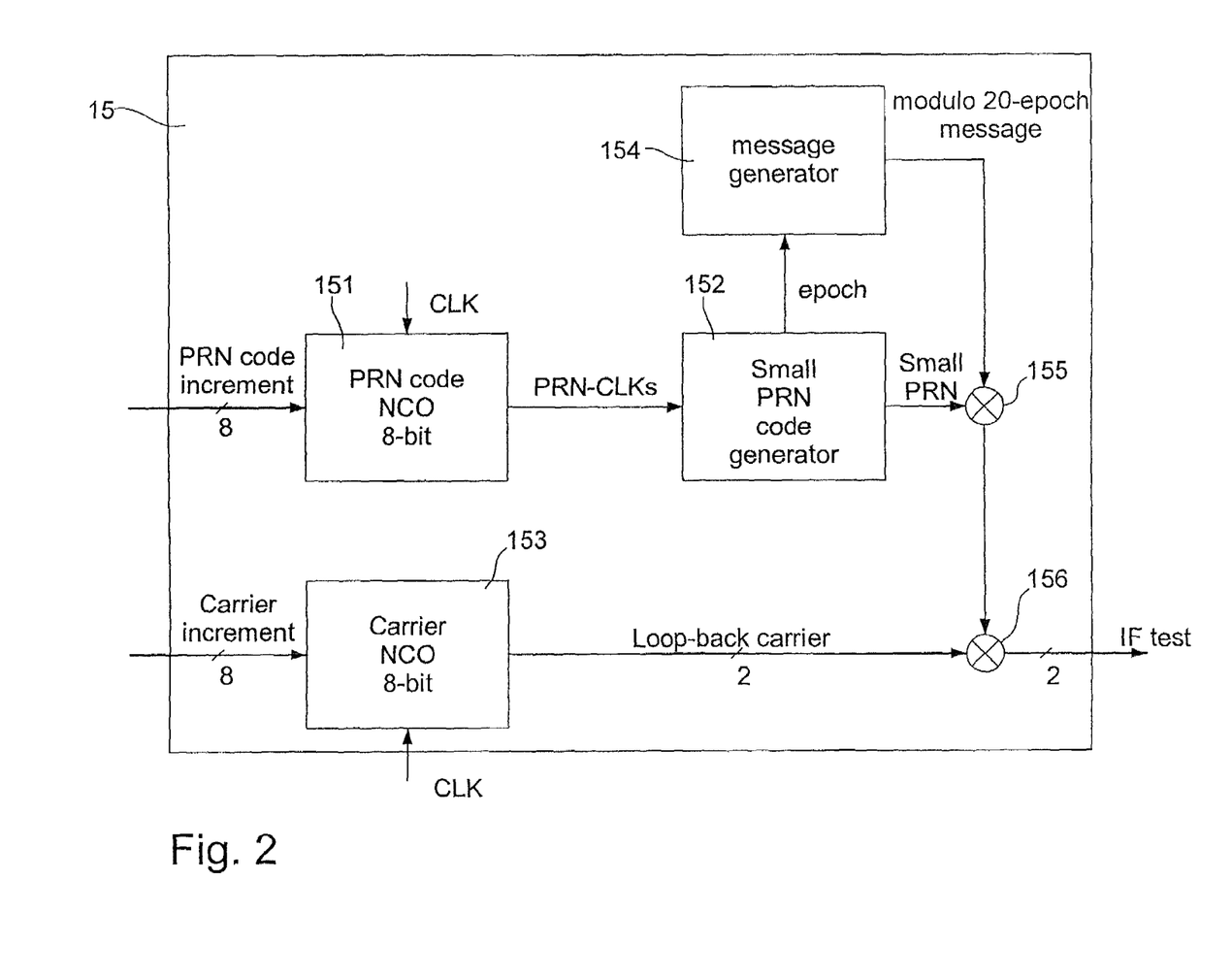
FIG. 2 shows schematically the electronic elements of the test signal generator of the circuit according to the invention.

FIG. 2 shows schematically the different units forming test signal generator 15. This test signal generator is switched on at the command of the microprocessor as explained previously. As soon as it is switched on, it generates intermediate test signals $IF_{test}$ intended to be introduced into the correlation stage to be tested in a closed loop. The noise-free intermediate test signals $IF_{test}$ have to be designed in the same way as the intermediate signals extracted from the radio-frequency signals shaped in the receiver. However, the intermediate test signals or substitution signals have to be modulated with a pseudo-random code of shorter length than the Gold code in order to reduce the correlation stage test time.

Test signal generator 15 includes an 8-bit numerically controlled oscillator (NCO) 151 for the code clocked by the clock signals CLK, a small PRN code generator 152, a message generator 154, an 8-bit numerically controlled oscillator (NCO) 153 for the carrier frequency clocked by clock signals CLK and two signal mixers 155 and 156. The two 8-bit oscillators 151 and 153 have a frequency resolution of the order of 17 kHz which is defined by the clock frequency CLK of 4.36 MHz divided by $2^8$.

In test phase, the two 8-bit numerically controlled oscillators 151 and 153 each receive an 8-bit binary word from the microprocessor. The first oscillator 151 receives a code increment for generating a clock signal PRN-CLKs to clock small PRN code generator 152 which follows. The second oscillator 153 receives a carrier frequency increment for generating carrier signals, of which one is an in-phase signal and the other is a quarter-phase signal. The value of the carrier frequency does not have much importance for the closed loop test of the correlation stage. Consequently, this carrier frequency can take a value of 400 kHz like the conventional intermediate signals, or a lower value.

Figure 3A:
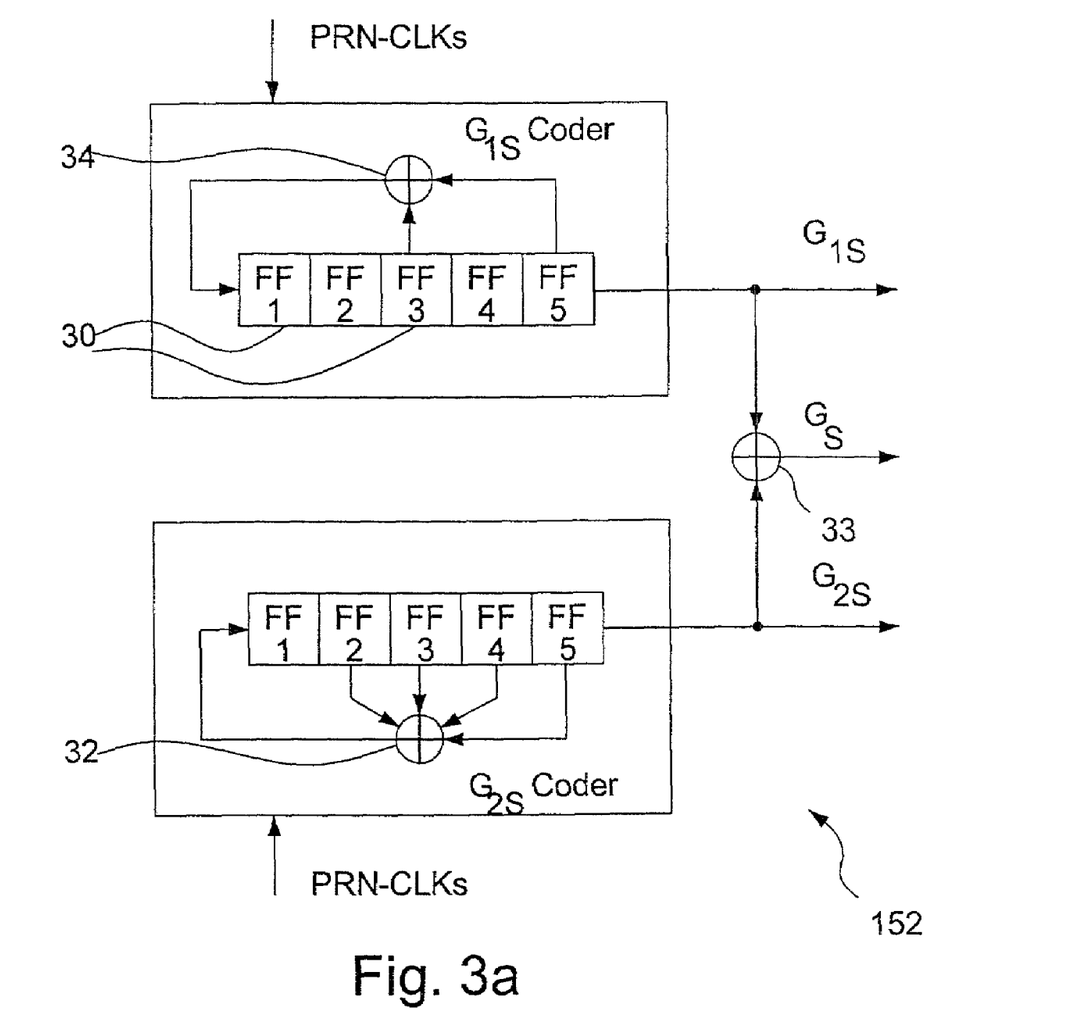
FIG. 3a shows a reduced PRN code generator of the test signal generating means according to the invention.

Small PRN code generator 152, shown in more detail in FIG. 3a, receives clock signal PRN-CLKs from oscillator 151 in order to generate pseudo-random code of reduced repetition length. The repetition length of this code is preferably 31, i.e. $2^5-1$, as explained hereinafter.

The frequency of clock signal PRN-CLKs is a function of the code increment introduced at the input of numerically controlled oscillator 151. If the code increment is fixed at a value of 24, which is 11000 in binary digits, clock frequency PRN-CLKs equals 24 times 17 kHz, i.e. 408 kHz. The code increment could of course be fixed higher so as to approximate the frequency of 1.023 MHz for a correlation stage code generator in normal operation. However, the value of 408 kHz of frequency PRN-CLKs has been chosen in order to allow the test phase to approximate the real processing of said correlation stage in normal operation.

The output signals of the correlation stage, as explained with reference to FIG. 4, have to be equivalent whether they are conventional intermediate signals, which include a noise approximately 16 dB greater than the useful signals, or noise-free intermediate test signals supplied at the input of the correlation stage. The object is to take account of the inherent radio-frequency signal noise to do a quick test of the correlation stage, close to reality, with noise-free test signals.

In order to provide intermediate test signals similar to conventional intermediate signals, a message has to be placed at frequency of 50 Hz on the carrier frequency signals. This allows the microprocessor to check at the end of the test that each channel has managed to demodulate the correct message. In order to do this, a message generator 154 is clocked by an epoch signal (1 ms) to give a message at 50 Hz (modulo 20-epoch).

The message from message generator 154 and the reduced PRN code from small PRN generator 152 are mixed in mixer 155. The output of this mixer 155 is also mixed or modulated on the loop carrier in mixer 156 to generate intermediate test signals $IF_{test}$.

FIG. 3a shows small pseudo-random code generator 152 in more detail, the structure of said generator being well known to those skilled in the art in this technical field. Since it has to generate a code length of 31, it includes in an encoder $G_{1S}$ and in an encoder $G_{2S}$ a series of five flip-flops 30 defined by the reference FF and the number of each flip-flop. A state transfer of each flip-flop 30 is produced from flip-flop FF1 to flip-flop FF5 at each clock stroke PRN-CLKs.

In first encoder $G_{1S}$, flip-flops 30 FF3 and FF5 each have an output added in XOR type adder 34. The output of adder 34 is introduced into flip-flop FF1 in order to generate a first encoded signal $G_{1S}$ at the output of the last flip-flop FF5 at each clock stroke PRN-CLKs.

In second encoder $G_{2S}$, flip-flops 30 FF2 to FF5 each have an output added in XOR type adder 32. The output of adder 32 is introduced in flip-flop FF1 in order to generate a second encoded signal $G_{2S}$ at the output of the last flip-flop FF5 at each clock stroke PRN-CLKs.

First and second encoded signals $G_{1S}$ and $G_{2S}$ are also added in a XOR type adder 33 in order to generate encoded signal $G_S$ which corresponds to the output signal from small PRN code generator 152.

Figure 3B:
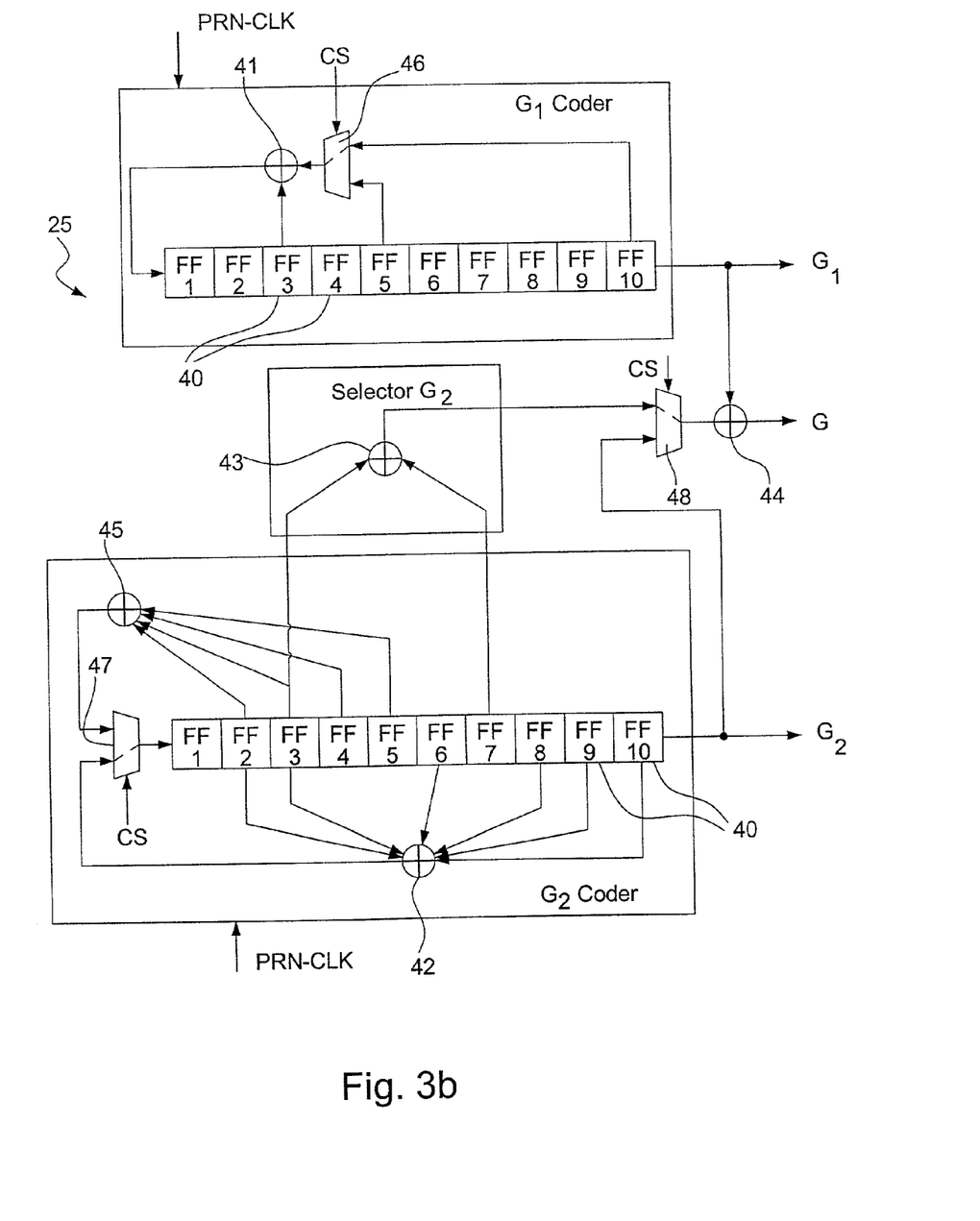
FIG. 3b shows a PRN code generator which can be configured in normal operating mode and in test mode for each channel of the correlation stage of the circuit according to the invention.

FIG. 3b shows a conventional pseudo-random code generator 25 used in each correlator of the correlation stage. The structure of this generator is well known to those skilled in the art in this technical field for the purpose of generating a Gold code replica in normal operation. However, this code generator 25 also includes multiplexers 46 to 48 in order to be able also to configure said generator in test phase. In test phase, this code generator 25 has to be configured to generate a pseudo-random code replica generated in the test signal generator, i.e. a code having a repetition length of 31 ($2^5-1$).

Pseudo-random code generator 25 includes a first encoder $G_1$ in which ten flip-flops 40, defined by the reference FF and the number of each flip-flop, are placed in series, a second encoder $G_2$ in which ten flip-flops are also placed in series, and a time shift selector $G_2$ (TAP selector) to define a specific satellite code. In normal operation, flip-flops FF3 and FF10 of encoder $G_1$ each have an output added in XOR type adder 41. The output signal from flip-flop FF10 passes freely (shown in dotted lines in the Figure) through multiplexer 46 if no instruction CS is applied to said multiplexer 46. The output of adder 41 is introduced at the input of flip-flop 40 FF1 in order to generate a first encoded signal $G_1$ at the output of the last flip-flop FF10 at each clock strode PRN-CLK. This clock signal PRN-CLK in normal operation has a value of approximately 1.023 MHz while in test phase it has to have a value of approximately 408 kHz as a function of the intermediate test signals.

In test phase, an instruction CS is imposed on multiplexer 46 so that only the outputs of flip-flops 40 FF3 and FF5 are added in adder 41. This configuration corresponds to encoder $G_{1S}$, explained with reference to FIG. 3a, to generate an output signal $G_{1S}$.

In encoder $G_2$, flip-flops FF2, FF3, FF6, FF8, FF9 and FF10 each have an output added in XOR type adder 42. The output of adder 42 is introduced at the input of first flip-flop 40 FF1 through multiplexer 47. In normal operation, the output of multiplexer 42 passes freely (shown in dotted lines in the Figure) through multiplexer 47 if no instruction CS is imposed on said multiplexer 47. A second encoded signal $G_2$ is thus generated at the output of the last flip-flop 40 FF10 of second encoder $G_2$ at each clock stroke PRN-CLK.

The outputs of flip-flops FF2 to FF5 of encoder $G_2$ are introduced into XOR type adder 45 the output of which is placed at the input to multiplexer 47. In test phase, an instruction CS is imposed on multiplexer 47 so that the output of adder 45 is introduced at the input of first flip-flop FF1 instead of the output of adder 42. This configuration corresponds to encoder $G_{2S}$, explained with reference to FIG. 3a, to generate an output signal $G_{2S}$.

Selector $G_2$ includes in particular a XOR type adder 43 which adds the output signals from two flip-flops selected from among the ten flip-flops 40, for example flip-flops 40 FF3 and FF7 of second encoder $G_2$ to generate a specific code of a determined satellite. The addition by adder 43 of selector $G_2$ also generates a certain delay which is well known to those skilled in the art in this technical field.

The output of this adder 43 passes freely (shown in dotted lines in the Figure) through a multiplexer 48 if no instruction CS is imposed on said multiplexer 48. Thus, in normal operation, the output of selector $G_2$ can be added with output $G_1$ in a XOR type adder 44 to give output signal G. In this case, output G defines the generation of a Gold code replica specific to a determined satellite.

In test phase, an instruction CS is imposed on multiplexer 48 so that only outputs $G_1$ and $G_2$ are added in adder 44 in order to generate a signal which corresponds to signal $G_S$ explained with reference to FIG. 3a.

Figure 4:
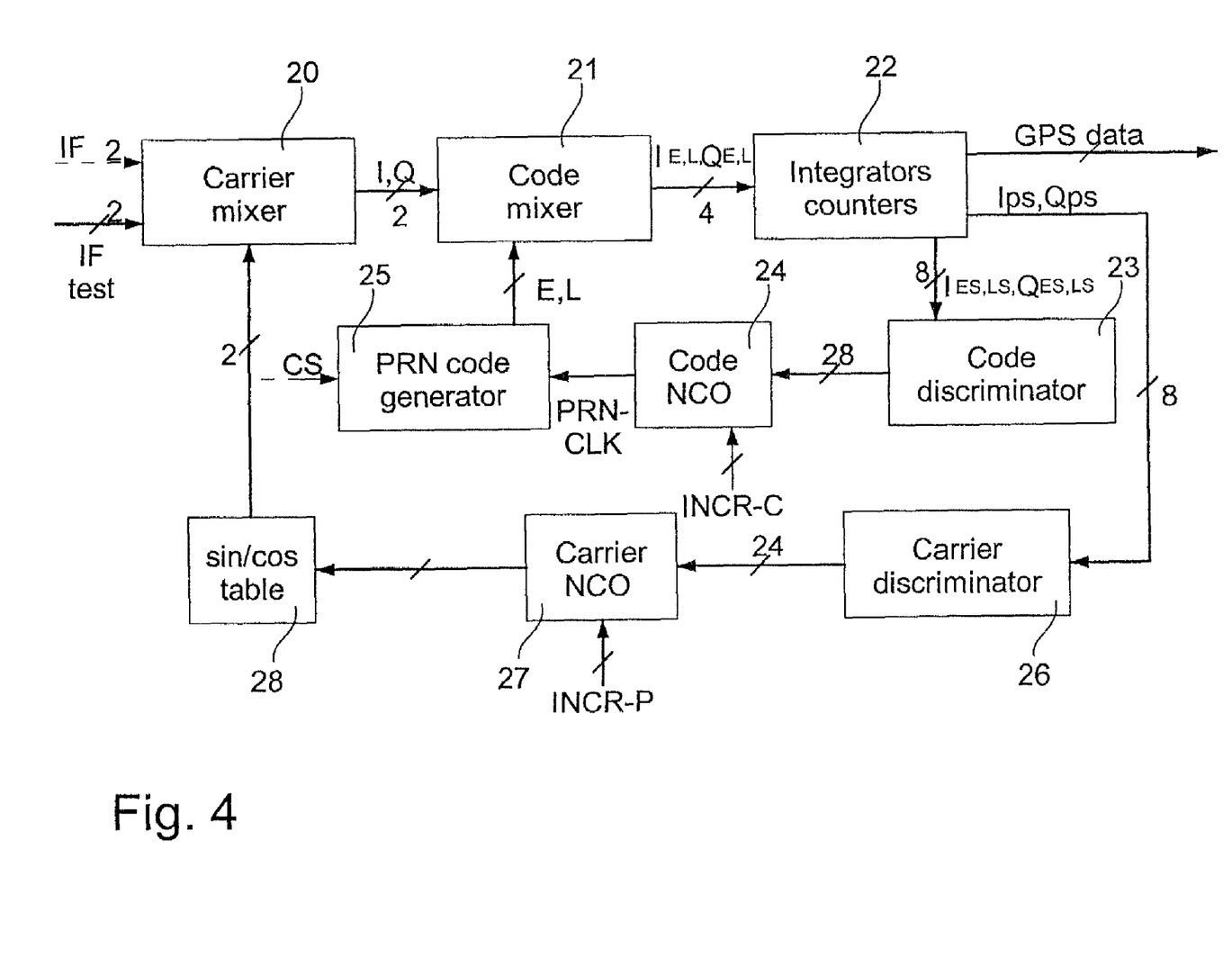
FIG. 4 shows schematically the elements of a correlator of the correlation stage according to the invention.

FIG. 4 shows the different electronic elements of a correlator of the correlation stage which is well known to those skilled in the art in this technical field. For more details relating to the various elements of this correlator, the reader may refer to the teaching drawn from the book "Understanding GPS Principles and Applications" at chapter 5 by Philip Ward and editor Elliott D. Kaplan (Artech House Publishers, USA 1996) ISBN edition number 0-89006-793-7, and in particular to FIGS. 5.8 and 5.13 which show in large lines all the elements of FIG. 4. It is to be noted that in the Figure, the lines shown in bold with an oblique bar define a certain number of parallel bits.

In test phase, all the correlators of the correlation stage channels are configured in the same way for the test representing the operation of the correlation and demodulation circuit. For the sake of simplification in the following description, only one of the correlators is described.

The correlator includes a carrier mixer 20, a code mixer 21, integrator counters 22, code discriminators 23 and carrier discriminators 26, numerically controlled oscillators for the code 24 and the carrier 27, a pseudo-random code generator 25, and a sin/cos table 28 for the carrier.

First of all, carrier mixer 20 receives at one input either intermediate signals IF in normal operation, shown by a dotted line, or intermediate test signals $IF_{test}$ in test phase. These intermediate signals are complex signals, i.e. they are formed of an in-phase signal I and a quarter-phase signal Q in accordance with the formula (I+iQ). The choice of signals reaching mixer 20 is imposed by the microprocessor control means as explained hereinbefore. These intermediate signals are processed in a PRN code control loop and a carrier control loop.

In mixer 20, intermediate signals $IF_{test}$ are multiplied on the one hand by the Cosines minus i times the Sinus of the internally generated carrier replica in order to extract in-phase signal I from the intermediate complex signals, and on the other hand by the minus Sinus minus i times the Cosines of the internally generated carrier replica, in order to extract the quarter-phase signal Q from the intermediate signals.

After this carrier correlation operation, signals I and Q are inputted in a code mixer 21 in order to find the PRN code equivalence with that generated internally. In-phase signal I and quarter-phase signal Q are each multiplied on the one hand by an early replica E of the PRN code and on the other hand by a late replica L of the PRN code to give four output signals $I_E$, $I_L$, $Q_E$ and $Q_L$. In each correlation stage channel, only the early and late replicas, which are spaced by a half chip have been kept without taking account of the intermediate punctual replica.

The four correlation signals $I_E$, $I_L$, $Q_E$ and $Q_L$ are inputted into integrator counters 22 which are pre-detection elements. The four output values $I_{ES}$, $I_{LS}$, $Q_{ES}$ and $Q_{LS}$ of integrator counters 22 are represented by 10 bits which corresponds to a complete cycle of the Gold code. However, only 8 most-significant bits are used in the code and carrier control loops.

In normal operation, a complete set of output values $I_{ES}$, $I_{LS}$, $Q_{ES}$ and $Q_{LS}$ is obtained after each millisecond or each epoch, since the code repetition length is 1023 chips with a code clock frequency of 1.023 MHz. Conversely, in test phase with a code repetition length reduced to 31 chips and a code clock frequency of 408 kHz, a complete set of output values is obtained after approximately each 76 μs. This value of 76 μs corresponds to the division of 31 by 408 kHz.

In order to provide the complete set in normal operation or in test phase, integrator counters 22 begin counting following the beginning or end of each code sequence. Thus, it may be estimated that the time gain for obtaining the output values which correspond to the integration time ratio, i.e. (1 ms/76 μs), multiplied by the code repetition length ratio, i.e. 1023/31. The time gain for the closed loop test of the correlation and demodulation circuit is approximately 435 times less than the test time achieved if the pseudo-random code has a repetition length of 1023. This gain could even be 1000 times less if the code clock frequency were fixed at 1023 MHz in test phase, since the integration time would pass from 76 μs to approximately 31 μs.

Two other output values $I_{PS}$ and $Q_{PS}$ corresponding to the pseudo-punctual values are obtained by adding the two output signals $I_{ES}$ and $I_{LS}$ for the value $I_{PS}$, and the two signals $Q_{ES}$ and $Q_{LS}$ for the value $Q_{PS}$.

In the PRN code control loop, the four output signals $I_{ES}$, $I_{LS}$, $Q_{ES}$ and $Q_{LS}$ are introduced into a code discriminator 23 which performs the energy calculating operations for said output signals. A value accumulation during a certain number of integration cycles, for example 16 cycles, is performed in code discriminator 23. This discriminator 23, which also includes a filter, supplies a filtered code phase loop increment to a code numerically controlled oscillator (NCO) 24. This phase loop increment allows the phase to be adjusted to generate the code replica. This oscillator 24 thus receives for example a filtered 28-bit binary word from discriminator 23.

At the beginning of a search procedure, a code phase increment INCR-C is provided via the microprocessor and parameter input and output registers in order to fix the start value of the code clock frequency which oscillator 24 has to provide. Of course, the value of this increment INCR-C is different if the circuit is in normal operating mode or test phase.

The clock frequency signal PRN-CLK is supplied to PRN code generator 25 to clock the generation of the early and late replicas of the pseudo-random code. If an instruction CS is imposed on code generator 25, this means that the generator is configured in test phase to generate a code replica with a repetition length of 31. Likewise, in test phase, the increment INCR-C supplied to numerically controlled oscillator 24 is such that the clock frequency PRN-CLK at the output of the oscillator preferably has a value of 408 kHz.

In the carrier control loop, the pseudo-punctual output signals $I_{PS}$ and $Q_{PS}$ are inputted into carrier discriminator 26. A value accumulation is performed during a certain number of integration cycles, for example 16 cycles, in carrier discriminator 26. This discriminator 26 which also includes a filter, supplies a filtered carrier loop increment to a carrier numerically controlled oscillator (NCO) 27. This carrier loop increment allows the frequency to be adjusted to generate the carrier replica. This oscillator 27 thus receives for example a filtered 24-bit binary word from discriminator 26.

As for the code control loop at the beginning of a search procedure, a frequency increment INCR-P is inputted in particular via the microprocessor. Frequency increment INCR-P allows the carrier frequency generated by oscillator 27 to be fixed initially at a comparable value to the carrier frequency of the intermediate signals. Of course, the value of this increment INCR-P is different if the circuit is in normal operating mode or test phase.

The output signals from numerically controlled oscillator 27 are supplied to a sin/cos table 28 so that the latter gives two complex signals to mixer 20. The complex signals (Cosx-iSinx) and (-Sinx-iCosx) are multiplied in mixer 20 with the intermediate complex signals to provide an in-phase signal I and quarter-phase signal Q.

As described hereinbefore, the fact of choosing a repetition length of 31 chips for the pseudo-random code modulated on the intermediate test signals allows an inherent noise in the radio-frequency signals having a code repetition length of 1023 chips, to be taken into account in the circuit test phase.

The conventional intermediate signals IF supplied to the correlation stage include noise which is approximately 16 dB greater than the useful signals. Account must therefore be taken of the signal to noise ratio (SNR) of the real signals on the output signals provided by integrator counters 22 in order to have comparable values with the intermediate test signals which are noise-free. Normally, output signals appear with an SNR comprised between 15 and 20 dB when the code replica is in phase with the intermediate test signal code.

If a test of the correlation stage were performed with noise-free radio-frequency signals generated outside the receiver, there would be a risk of saturation as regards integrator counters 22. This is why in order to have a test representative of the operation of the correlation stage with radio-frequency test signals, it would be necessary to add noise to said signals. Conversely, with the intermediate test signals of the present invention, no noise has to be added, since there is no saturation observed in the output value accumulation of the integrator counters.

The power of the integrator output signals depending on the radio-frequency signals received by the receiver is given by the formula $P_s=(C/N_0)T\sigma^2$ where $(C/N_0)T$, with T having a value of 1 ms, represents the signal to noise ratio (SNR) and $\sigma^2$ represents the mean noise power. The intermediate test signals thus generate integrator counter output signals with a comparable output power to the output power of the real radio-frequency signals which include noise. This thus allows a closed loop operating test, which is close to reality, to be performed on the correlation stage with noise-free test signals having a pseudo-random code reduced to 31.

At the end of the test phase, the intermediate signal messages are demodulated in each output channel of integrator counters 22 in order to supply data to microprocessor. As a function of the test result and data received, the microprocessor can check whether each correlation stage channel is working properly. As a result of the reduction in the pseudo-random code repetition length, the test time is greatly reduced while guaranteeing a closed loop test comparable to a real operating test. More than 90% of the elements can thus be tested in this closed loop test mode.

This closed loop test operation can be repetitioned at determined periods of time, as explained previously, as a function of programming the microprocessor means. Of course, this programming is useful when the receiver with the correlation and demodulation circuit, which includes the test signal generator, is mounted in a portable object powered by a battery or an accumulator. This portable object may of course be a watch or a portable telephone for example in which it is necessary to save power consumption even in test phase.

Nonetheless, it is entirely possible to envisage performing this test before the operations for mounting the correlation and demodulation circuit in the receiver have occurred. In such case, the closed loop test of the correlation stage of the circuit may be performed on a test bench, or even at the end of the production line of the circuits on the wafers.

Of course other embodiments of the correlation and demodulation circuit may also be envisaged by those skilled in the art without departing from the scope of the invention defined by the claims. The circuit which can be configured in normal operating mode and in test mode may be used in any receiver for signals modulated by a determined code repetition length. The intermediate test signals may be supplied by a test signal generator which is located for example on the test bench rather than the generator being integrated in the circuit. However, since the test signal generator only includes forty or so logic gates or flip-flops, whereas the circuit has close to 2 million transistors, this constitutes only a minute additional space on the circuit.

What is claimed is:

1. A correlation and demodulation circuit for a receiver for signals modulated by a first code of a determined repetition length, said first code defining a source transmitting said signals, said circuit including a correlation stage connected to a control means for configuring said correlation stage in normal operating mode or in test mode, in normal operation said stage receiving intermediate signals corresponding to the modulated signals shaped in a receiver modulated signal receiving means, said intermediate signals being correlated in a correlator control loop of said correlation stage with a replica of the first code supplied by a code generator, wherein in test phase, said code generator is adapted via said control means to generate a replica of a second repetition code shorter than the first code for correlation operations with intermediate test signals modulated by the second code of shorter repetition length than the first code and supplied to the correlation stage so as to perform a test representative of the correlation stage in closed loop operation more quickly than with signals modulated by the first code.

2. A correlation and demodulation circuit according to claim 1, further comprising a test signal generator for supplying, in test phase, the intermediate test signals to the correlation stage instead of intermediate signals from the receiver, said test signals being modulated by the second code of shorter repetition length than the first code so as to perform a test representative of the correlation stage in closed loop operation.

3. A correlation and demodulation circuit according to claim 2, wherein said correlation and demodulation circuit is configured to receive radio frequency signals from a plurality of transmitting satellites, the first code being a first pseudo-random code which is different for each transmitting satellite, wherein the test signal generator supplies, in test phase, test signals modulated by a second pseudo-random code of shorter repetition length than the first pseudo-random code, and wherein the code generator is adapted via said control means to generate a replica of the second pseudo-random code for the correlating operations with the test signals in test phase.

4. A correlation and demodulation circuit according to claim 3 wherein said correlation and demodulation circuit forms part of a GPS receiver, wherein the control means forms part of a microprocessor means for calculating position, speed and time data, adapting control loop parameters at the beginning of the correlation operations and checking that the correlation stage works properly in test phase.

5. A correlation and demodulation circuit according to claim 4, wherein the correlation stage includes several channels each of which is provided with a correlator to allow several satellites, visible by the receiver, to be acquired and tracked simultaneously in normal operation, whereas in test phase all the correlation stage channels, in which each channel is provided with a code generator adapted to generate the same second code replica, receive only the test signals from the test signal generator in order to check simultaneously that the correlating operations of all the correlation stage channels are working properly.

6. A correlation and demodulation circuit according to claim 4, wherein the microprocessor means is programmed so as to control the test phase of the correlation stage at predetermined periods of time.

7. A correlation and demodulation circuit according to claim 3, wherein the test signal generator generates, in test phase, carrier frequency test signals modulated by the second pseudo-random code whose repetition length is determined so as to take into account, in control loops relating to the carrier frequency and to the pseudo-random code of the correlation stage, of inherent noise in the radio-frequency signals modulated by the first pseudo-random code, in order to have a comparable power with the output signals from pre-detection elements, which are integrator counters.

8. A correlation and demodulation circuit according to claim 5, wherein the microprocessor means defines, in collaboration with the code generator of said each channel of the correlation stage, a pre-detection element integration duration as a function of the repetition length of the first or second pseudo-random code.

9. A correlation and demodulation circuit according to claim 4, wherein the test signal generator includes a second pseudo-random code generator, a first numerically controlled oscillator for supplying clock signals to the second pseudo-random code generator on the basis of a first binary word provided by the microprocessor means, a second numerically controlled oscillator for generating carrier frequency signals on the basis of a second binary word provided by the microprocessor means, the second pseudo-random code being modulated on said carrier frequency signals, and a message generator whose message signals are also modulated on the carrier frequency signals, the correlation stage being intended to supply test message data to the microprocessor means for the closed loop operating test phase check of the correlation stage.

10. A correlation and demodulation circuit according to claim 7, wherein the second pseudo-random code has a repetition length equal to 31, whereas the first pseudo-random code of the radio-frequency signals has a repetition length equal to 1023 in order to supply, at one output of the correlation stage pre-detection elements, comparable signals taking into account inherent noise in the radio-frequency signals.

11. A correlation and demodulation circuit according to claim 5, wherein the correlation stage includes, for each channel, a controller connected to the correlator for implementing an algorithm for processing digital signals in all synchronisation tasks in order to adjust phase and/or frequency parameters for each code generator in a normal operating mode or in a test mode.

12. A correlation and demodulation circuit according to claim 5, wherein the correlator of each channel of the correlation stage includes means for generating a replica of carrier frequency signals adapted by said microprocessor means in a normal operating mode or in a test mode, as a function of the carrier frequency of the intermediate signals supplied to the correlator.

13. A correlation and demodulation circuit according to claim 1, wherein said circuit is made on a single semiconductor substrate, which is a silicon substrate.

* * * * *